Aug. 31, 1926.

C. W. HUOTARI

SIGNAL

Filed Jan. 16, 1926

WITNESSES:
R. E. Wise.

INVENTOR
C. W. Huotari

BY Victor J. Evans

ATTORNEY

Aug. 31, 1926.

C. W. HUOTARI 1,597,892

SIGNAL

Filed Jan. 16, 1926    2 Sheets-Sheet 2

WITNESSES:
R. E. Wise

INVENTOR
C. W. Huotari

BY Victor J. Evans

ATTORNEY

Patented Aug. 31, 1926.

1,597,892

UNITED STATES PATENT OFFICE.

CHARLES W. HUOTARI, OF ABERDEEN, WASHINGTON.

SIGNAL.

Application filed January 16, 1926. Serial No. 81,846.

This invention relates to improvements in signal devices for automobiles and has for an object the provision of means for indicating the intention of the driver to stop, or to turn, and the direction of the proposed turn.

Another object of the invention is the provision of a direction signal which includes a casing or housing divided into separate signal compartments, each of which is provided with individual illuminating means and one of which is provided with an opening closed by a transparent panel for the purpose of illuminating the usual license plate, the partition being removably secured in place, and in addition to supporting the compartment illuminating means, also serves to retain in position, a frame for retaining the transparent panel.

With the above and other objects in view, the invention further includes the following novel features and details of construction, to be hereinafter more fully described, illustrated in the accompanying drawings and pointed out in the appended claims.

In the drawing:—

Figure 1:
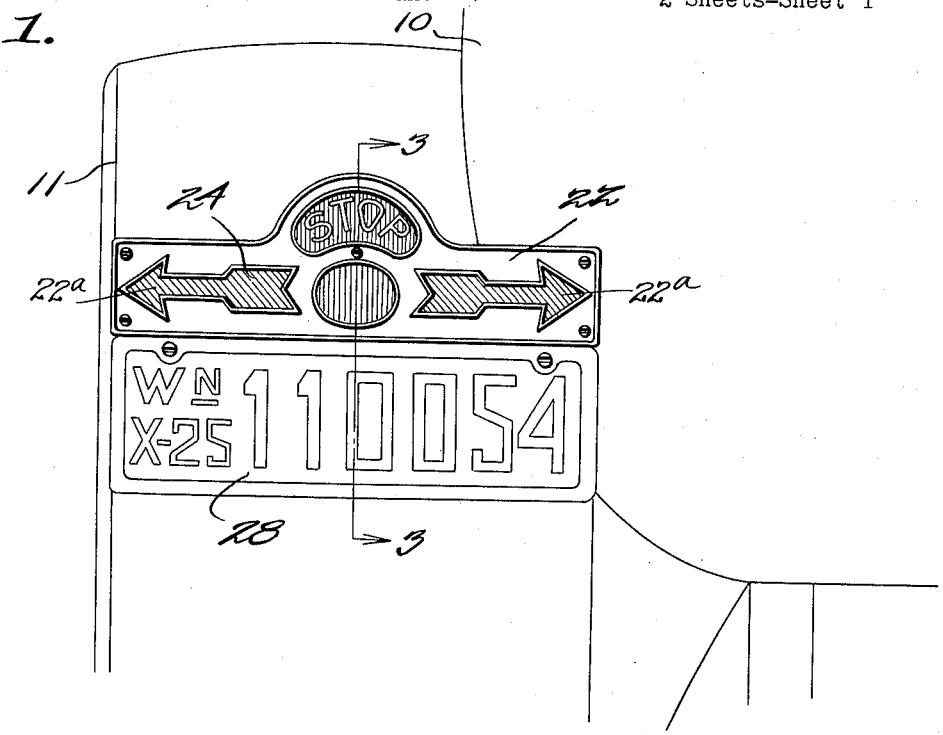
Figure 1 is an elevation of my invention as applied to the left rear fender of a motor vehicle.
Figure 2:
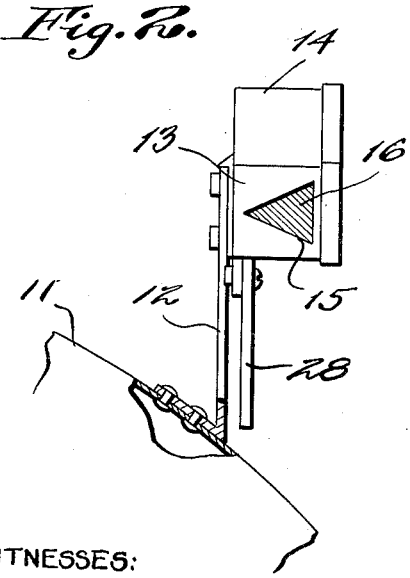
Figure 2 is a side elevation of the signal as attached.
Figure 3:
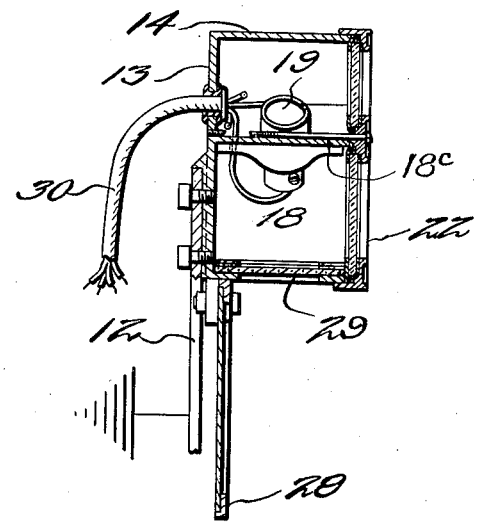
Figure 3 is a vertical sectional view taken on line 3—3 of Figure 1.

Referring to the drawing in detail, wherein like charcters of reference denote corresponding parts, the reference character 10 indicates a fragmentary portion of a motor vehicle, 11 a left rear fender thereof, and 12 the conventional form of tail lamp bracket secured therein, all of the above being of the usual and well known construction and forming no part of the present application are shown for the purpose of illustrating the invention.

The invention comprises an elongated signal casing 13 having a centrally enlarged upwardly extending portion 14 provided upon its top wall, the purpose of which will be presently apparent. The ends of the casing or housing 13 have triangular cutout portions, each closed by a lens 16 arranged upon the inner side of the housing and held in place by angular shaped brackets 17.

Removably and centrally positioned within the casing or housing 13 is a partition 18 which carries a plurality of lamp sockets 19. The partition 18 comprises vertically disposed end walls 18ª whose upper ends are oppositely offset as at 18ᵇ and have their edges engaging the inner face of the top wall of the casing. A substantially horizontally disposed wall 18ᶜ has its opposite ends connected to the walls 18 at the lower or inner ends of the offset portions b of said walls. The partition thus divides the casing into centrally located upper and lower compartments and end compartments and the sockets 19 are so arranged that a bulb 19ª will extend into each of the compartments. The partition is provided with laterally offset apertured ears 20 which receive screws 21 and the latter threadedly engage the rear wall of the casing so as to removably hold the partition in place.

The casing includes a cover plate 22 which is provided with a plurality of transparent covered openings, one of these openings being provided for each compartment. A transparent panel or lens 24 serves to cover all of these openings and this panel is secured in place by a frame 25. Cushioning strips or gaskets 23 are positioned upon opposite faces of the panel 24.

The openings for the end compartments are in the form of arrows 22ª, while the upper compartment is designed to display the word "Stop." The lower compartment serves in place of the usual tail light and in addition is designed to illuminate the usual license plate 28. The arrows 22, when illuminated, indicate a proposed change in the direction of travel of the vehicle and the light of the particular end compartment illuminated will be shown through the cut out portions 15 at the ends of these compartments.

The said cover plate 22 having indicia arranged upon its opposite ends in the form of arrows and when illuminated will indicate the direction of travel to be taken by the motorist and which direction compartment and signal when illuminated will also be shown through the cutout portions 15 provided in the opposite ends of the casing or housing 13 in order that motorists upon said streets may easily determine the direction of travel to be taken by such vehicle equipped by the novel form of signalling apparatus. A stop lamp compartment and the necessary tail lamp being also defined in superimposed relation centrally of the cover plate 22.

Figure 4:
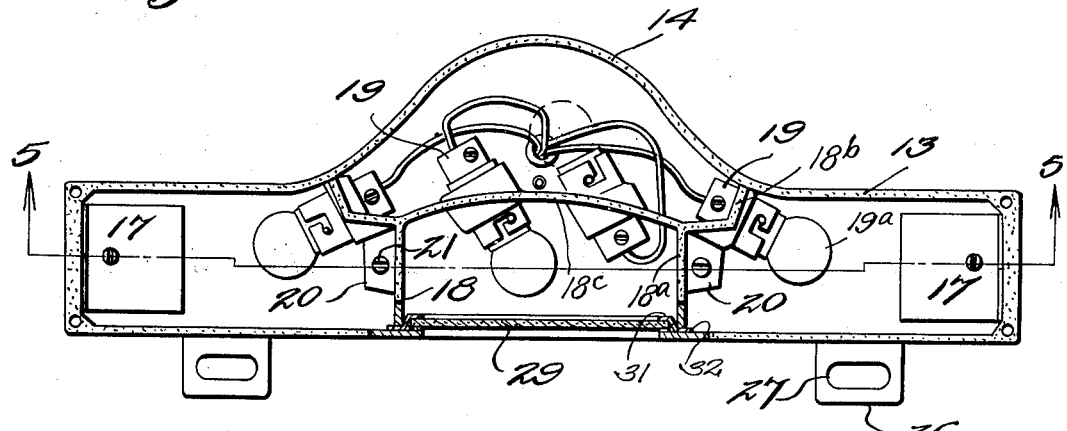
Figure 4 is a front elevation of the signal with the cover plate removed therefrom.
Figure 5:
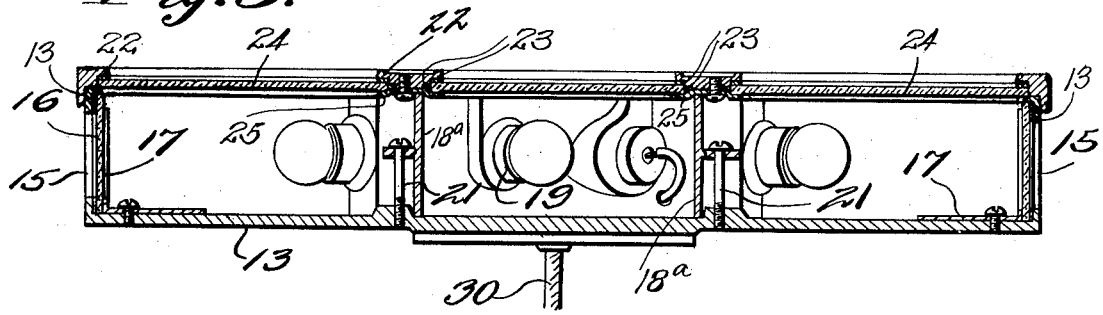
Figure 5 is a longitudinal sectional view taken on line 5—5 of Figure 4.
Figure 6:
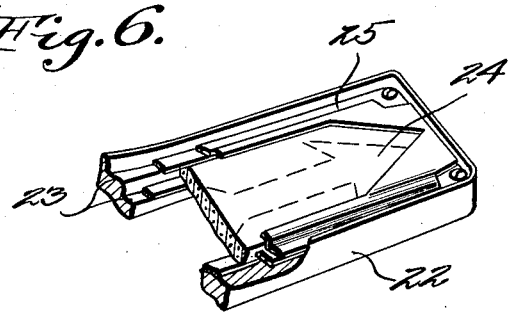
Figure 6 is a fragmentary perspective of the inner side of the signal cover plate and illustrating the manner in which the signalling indicia is associated therewith.

Downwardly extending ears 26 upon the under side of the casing or housing 13 are provided with transversely disposed elongated slots 27 for the reception of fastening elements for securing the upper edge of the license plate 28 thereto: the latter being illuminated through a transparent panel or lens 29. The lens 29 is held in place by means of a frame 31 which is provided at its opposite ends with offset flanges 32. As shown in Figure 4 of the drawings, the lower edges of the vertical walls 18ª of the partition 18 rest upon these offset flanges and the latter provide shoulders at opposite ends of the lens 29. The partition 18 thus serves to hold the frame 31 and its lens in place.

A cable 30 which may be connected with a source of electric energy, supplies current to the lamps and any suitable means may be provided for selectively controlling the current to the lamps so that any of the compartments of the casing may be selectively illuminated.

The invention is susceptible of various changes in its form, proportions and minor details of construction, and the right is herein reserved to make such changes as properly fall within the scope of the appended claims

Having thus described this invention, what is claimed is:—

1. In a direction signal, an elongated casing having a centrally located opening in its bottom wall, a transparent panel for the opening, a frame extending around the edges of the transparent panel to hold the latter in place, offset flanges extending laterally from the frame and engaging the bottom wall of the compartment along the opening and defining shoulders at opposite ends of said panel, a removable partition member comprising walls having their lower edges engaging the offset flanges of said frame along said shoulders and means engaging the top wall to hold said frame in place, the partition member and casing forming central and side compartments, and lamp supporting means in each compartment.

2. In a direction signal, an elongated casing having a front wall and a side wall at substantially a right angle to the front wall, the latter being formed with an opening having the shape of an elongated arrow with its point at a corner of the casing and the side of the casing formed with a triangular opening having its base near said corner and its apex directed away from the corner, so that when viewed from such a position that the front and side are visible at the same time, the triangular opening appears to form part of the arrow.

In testimony whereof I affix my signature.

CHARLES W. HUOTARI.